(12) United States Patent
Heuver

(10) Patent No.: US 11,121,601 B2
(45) Date of Patent: Sep. 14, 2021

(54) STATOR ATTACHMENT MECHANISM

(71) Applicant: Ford Global Technologies, LLC, Dearborn, MI (US)

(72) Inventor: Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 16/365,238

(22) Filed: Mar. 26, 2019

(65) Prior Publication Data
US 2020/0313500 A1 Oct. 1, 2020

(51) Int. Cl.
*H02K 5/22* (2006.01)

(52) U.S. Cl.
CPC ...................... *H02K 5/22* (2013.01)

(58) Field of Classification Search
CPC .............................. H02K 1/185; H02K 5/22
USPC ...... 310/216.049, 216.51, 216.052, 216.055, 310/216.058, 216.078, 216.97, 216.113, 310/216.118, 216.125, 216.126
See application file for complete search history.

(56) References Cited

U.S. PATENT DOCUMENTS

| | | | | |
|---|---|---|---|---|
| 4,538,084 A | * | 8/1985 | Kawada | H02K 5/15 310/216.055 |
| 6,337,530 B1 | * | 1/2002 | Nakamura | H02K 5/15 310/216.044 |
| 7,202,587 B2 | * | 4/2007 | Sargeant | H02K 1/185 310/418 |
| 2006/0279160 A1 | * | 12/2006 | Yoshinaga | H02K 1/16 310/216.011 |
| 2009/0302720 A1 | * | 12/2009 | Chiba | H02K 5/24 310/75 R |
| 2010/0277030 A1 | * | 11/2010 | Allen | H02K 5/24 310/215 |

FOREIGN PATENT DOCUMENTS

WO 2006045970 A1 5/2006
WO 2016189247 A1 12/2016

* cited by examiner

*Primary Examiner* — Naishadh N Desai
(74) *Attorney, Agent, or Firm* — David Kelley; Brooks Kushman, P.C.

(57) ABSTRACT

A stator system for an electric vehicle motor may include a stator forming a back iron and a plurality of teeth extending inwardly therefrom, the stator including a plurality of attachment points protruding radially outwardly from the back iron, and a case configured to house the stator and defining a plurality of case openings, each configured to receive one of the attachment points, wherein each attachment point defines at least one T-slot configured to receive a nut that cooperates with a bolt extending through the case to connect the case to the stator.

14 Claims, 6 Drawing Sheets

STATOR ATTACHMENT MECHANISM

TECHNICAL FIELD

Disclosed herein are stator attachment mechanisms.

BACKGROUND

Electric machines, including electric generators, motors, sirens, etc., may include a stator surrounding a rotor. The stator may be attached to a case and energy may flow through the stator to or from the rotor. It is important to have a strong attachment between the stator and the case so that the system may withstand the rotational forces created by the rotor. Furthermore, stresses imposed on the stator may affect the efficiency of certain electric vehicle motors.

SUMMARY

A stator system for an electric vehicle motor may include a stator forming a back iron and a plurality of teeth extending inwardly therefrom. The stator may include a plurality of attachment points protruding radially outwardly from the back iron, and a case configured to house the stator and defining a plurality of case openings, each configured to receive one of the attachment points, wherein each attachment point defines at least one T-slot configured to receive a nut that cooperates with a bolt extending through the case to connect the case to the stator.

A stator system for an electric vehicle may include a stator forming a back iron and a plurality of teeth extending inwardly therefrom, and at least one attachment point protruding axially outwardly from the back iron and configured to engage with a case, the attachment point defining at least one slot configured to receive a bolt to connect the case to the stator.

A stator system for an electric vehicle may include a stator forming a back iron and a plurality of teeth extending inwardly therefrom, and at least one attachment point protruding radially outwardly from the back iron and configured to engage with a case, the attachment point defining at least one slot configured to receive a nut that cooperates with a bolt to connect the case to the stator.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Stators for electric machines cooperate with a rotor and are attached to a case. Oftentimes, the stator is press fit into the case to maintain the stator therein and to keep the stator from rotating when subjected to rotor forces during operation. However, such press fitting may introduce compressive stresses in the back iron of the stator. Such stresses affect the magnetic properties of the stator and may result in loss of efficiency for the motor. On the other hand, the press fit adds significant structural strength to the case. Thus, keeping the strength provided by the press-fit while decreasing the stress created by the same, would increase efficiency while maintaining durability.

Disclosed herein is a connection mechanism configured to connect stator laminations to a case in a rigid manner, but without introducing compressive stresses to the back iron of the stator. The laminations may be stamped with T-slots. The T-slots may be either adjacent to axial bolt ears of the stator or in lieu thereof. T-nuts may then be inserted into the T-slots. Bolts may extend through the case walls into the T-nuts. When tightened, these joints will tie the case structurally to the stator back iron without introducing compressive stresses in the back iron.

Typically, the compressive stress introduced in the back iron increases as temperature increases. Further, the higher the compressive stress, the less efficient the electric motor.

Figure 1:
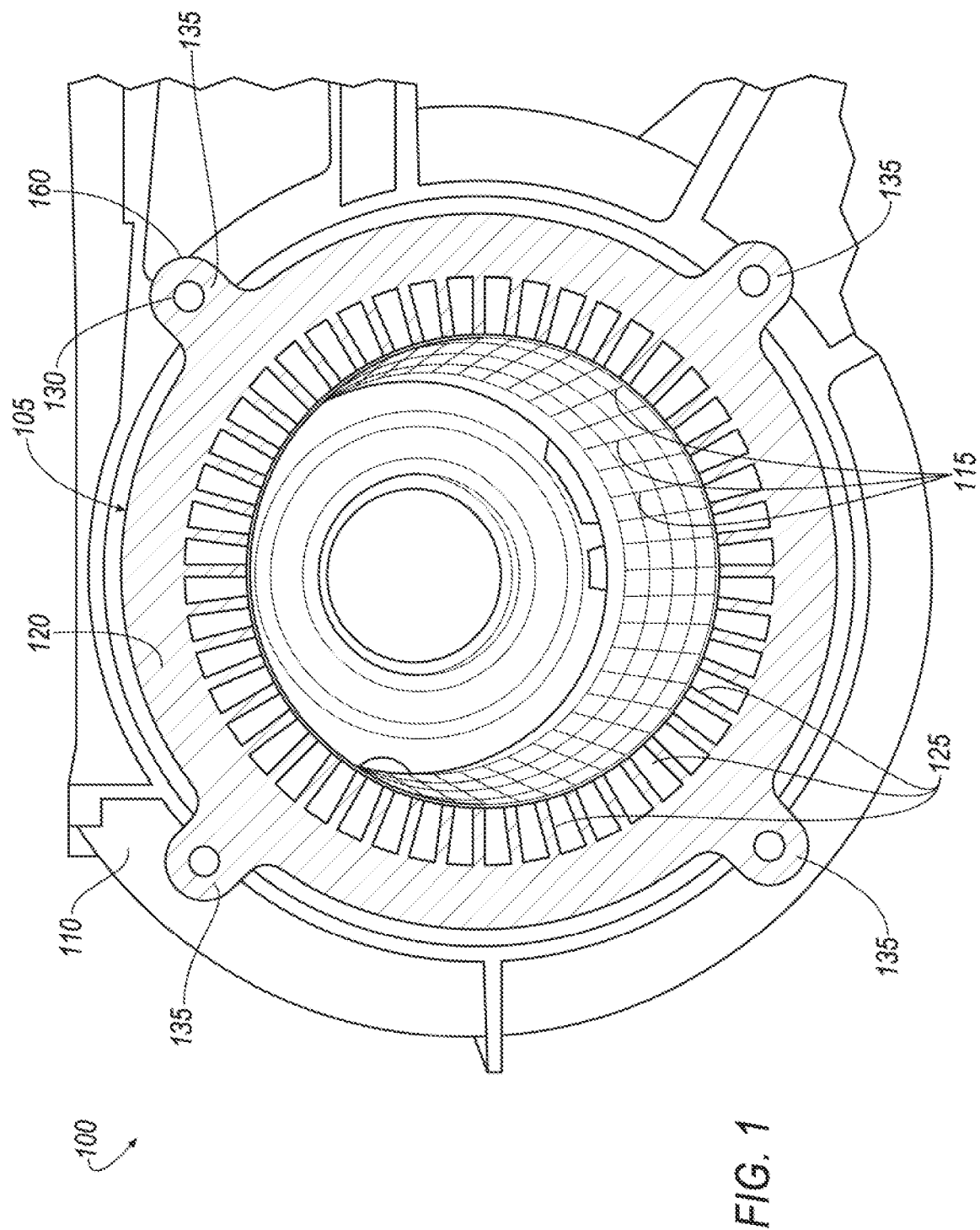
FIG. 1 illustrates an example stator system.

FIG. 1 illustrates an example stator system 100 including a stator 105 and a case 110 for an electric motor of a motor vehicle. The motor vehicle may be an electric vehicle (EV) including a hybrid electric vehicle (HEV) powered both by fuel and electricity, a plug-in hybrid electric vehicle (PHEV), and a battery electric vehicle (BEV). In electric vehicles, the efficiency of the motor may be very important and inefficiencies in the motor may cause a decrease in driving range.

The stator 105 may be configured to act as a magnet to allow energy to form and flow therethrough in an electric motor. The stator 105 may be made of iron, aluminum, steel, copper, etc. The stator 105 may be made of a plurality of laminations 115 that are placed side-by-side and stacked to form the disk-like circular form of the stator 105. The laminations 115 may form a back iron 120 of the stator 105. The back iron 120 may be a solid portion around the outer periphery of the stator 105. Each lamination 115 may also form teeth 125 extending radially inward from the back iron into the center of the stator 105. When aligned and stacked, the teeth 125 extend axially along a length of the stator. The stator teeth 125 may be configured to maintain coils therebetween (not shown).

The case 110 may be configured to surround and house the stator 105. The case 110 may be affixed to the stator 105 such that the case may maintain the stator 105 in a fixed position while the rotor (not shown) may rotate relative to the stator 105. The case 110 may surround the back iron 120 of the stator 105.

At least some of the laminations 115 of the stator 105 may form various axial attachment points 135 protruding radially outwardly along the outer periphery of the back iron 120. These axial attachment points 135 may be configured to be received, at least partially, within openings 160 defined by the case 110. Alternatively, the axial attachment points 135 may be configured to abut the case and be at a location at which the stator 105 attaches or fixes to the case 110. The axial attachment points 135 may be axial bolt ears formed via the laminations 115. A hole 130 may be stamped in the laminations to receive a pin or a bolt (not shown in FIG. 1) to secure the stator 105 to the case 110. Press-fitting items such as a pin may allow for rigid attachment of the case 110 to the stator 105.

The example in FIG. 1 illustrates four attachment points 135. However, it may be recognized that more or less attachment points 135 may be included radially and axially along the stator 105. The attachment points 135 may be equidistantly spaced around the back iron at one or more axial locations. In one example, eight attachment points may be included, four radial attachment points at 2 axial locations along the stator. More or less attachment points may be arranged at various axial and radial locations on the stator 105. The case 110 may define one opening or contour 160 to correspond and align with each attachment point 135.

As previously described, compressive stress caused by press-fitting of the stator 105 into the case 110 may affect the magnetic characteristics of the stator and decrease the efficiency of the motor. In some situations, especially within electric vehicles, the driving range may drop by 6-7 miles. As such, use of clamping bolts extending through the case 110 to engage attachment points 135 extending from the back iron of the stator 105 according to embodiments of the present disclosure provides similar structural stability for the case 110 as press-fitting the stator, but reduces or eliminates the compressive stress and associated reduced efficiency of the motor.

Figure 2:
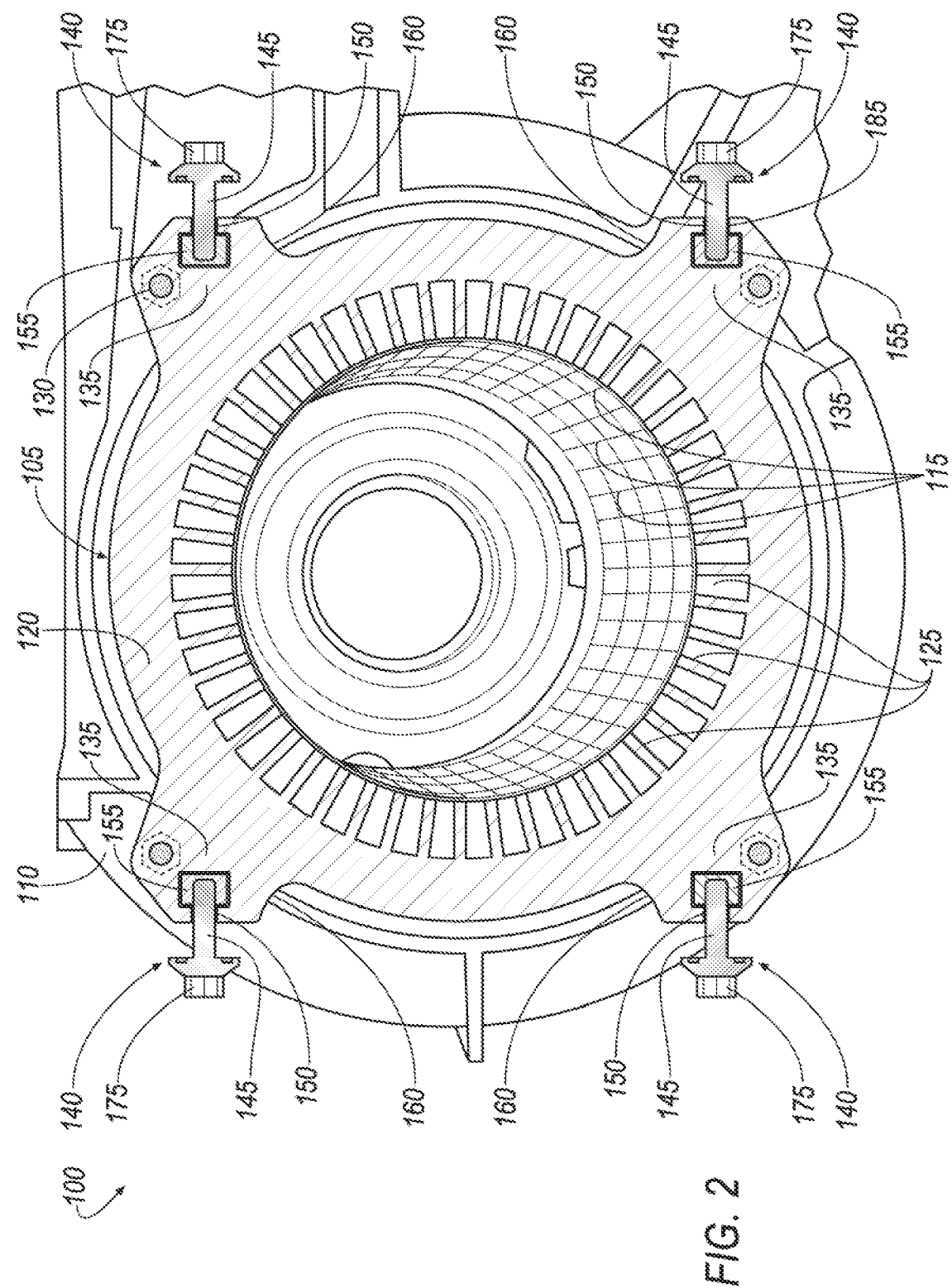
FIG. 2 illustrates the example stator system of FIG. 1 including an example attachment mechanism.

FIG. 2 illustrates an example stator system 100 including example attachment mechanisms 140. The attachment mechanisms 140 may be configured to attach the stator 105 to the case 110 without creating compressive forces on the back iron 120 of the stator 105. During manufacturing, the laminations 115 may be stamped with openings either adjacent to or in lieu of the axial bolt ears. The openings may be a T-slot 150 forming a T-like opening having an interior or proximal portion 153 (shown in FIG. 3) of the T-slot 150 with a larger dimension than a distal portion 152 (shown in FIG. 3) of the T-slot 150. The larger dimensioned proximal portion 153 may define a cube-like or rectangular-prism-like opening. The distal portion 152 of the T-slot 150 may be configured to receive a stator bolt 145. The stator bolt 145 may be a tie bolt having threading.

The case 110 may define the case opening or case contour 160 configured to receive the attachment points 135 of the stator. The case 110 may further define a bolt opening 165 configured to align with the distal portion 152 of the t-slot 150 and receive the stator bolt 145. The stator bolt 145 may include a bolt head 175 configured to abut an exterior surface of the case 110 at the bolt opening 165.

A nut 155 or other retaining device having a threaded opening may be maintained within the proximal portion 153 of the T-slot 150. Because the radius of the distal portion 152 is less than that of the proximal portion 153, the nut 155 may be maintained within the proximal portion 153 once installed. The nut 155 may have threads corresponding to those of the stator bolt 145. During installation, the bolt 145 may be configured to radially extend through the case 110 via the bolt opening 165 and subsequently through the T-slot 150 so that the bolt 145 engages the nut 155. Upon screwing the stator bolt 145 into the nut 155, the stator bolt 145 may engage with the nut 155 maintained within the proximal portion 153 of the T-slot 150 as well as engage with the case 110 via the bolt head 175. Thus, the tightening of the stator bolt 145 creates a clamping force via the nut 155 at a surface adjacent the distal portion 152 of the T-slot 150 and the bolt head 175, forcing the case 110 and stator 105 to pull towards one another and affixing the two parts together. The cube-like shape of the proximal portion 153 of the T-slot 150 may prevent the nut 155 from rotating. The nut 155 may have a closed end as shown in the figures, or may have an open end allowing the bolt 145 to extend therethrough.

The bolt had 175 may rest within the case contour 160. Additionally or alternatively, in one example, the bolt head 175 may extend outward of the stator 105 such that a portion of the bolt is exposed within the case opening 160. A clamp (not shown) may be arranged around at least the exposed portion of the bolt 145. The clamp may be arranged exterior to the case 110, or in some situations, within the case contour 160.

Figure 3:
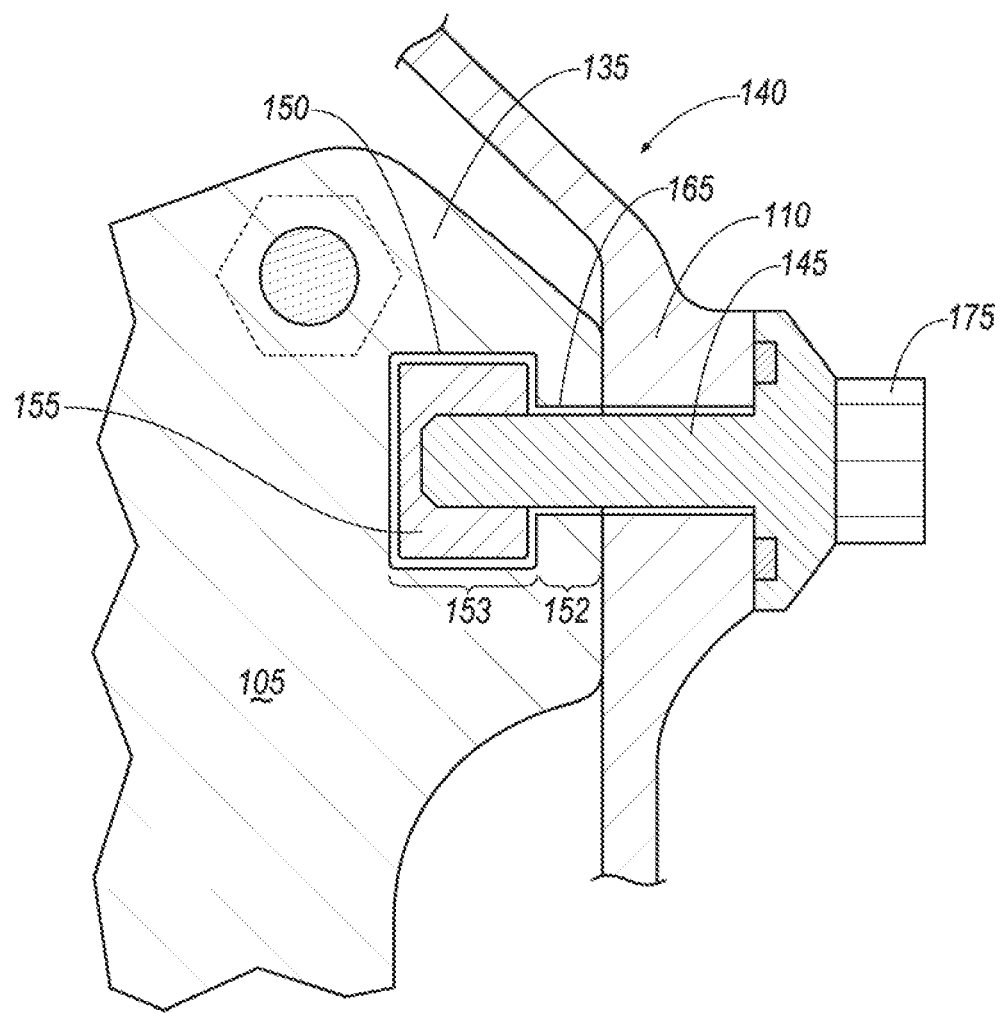
FIG. 3 illustrates a magnified cross-sectional view of the attachment mechanism.

FIG. 3 illustrates a magnified view of the attachment mechanism 140. As explained above, the attachment points 135 of the stator 105 may be received by respective case openings 160 defined by the case 110. Once the case 110 receives the attachment points 135 or ears, then the nut 155 may be inserted into the T-slot 150 of each attachment mechanism 140. The bolt 145 may be inserted through the case 110 and through the T-slot 150 defined in the attachment point 135 of the stator 105. The bolt 145 may be tightened to the nut 155, clamping the case 110 to the stator 105.

Figure 4:
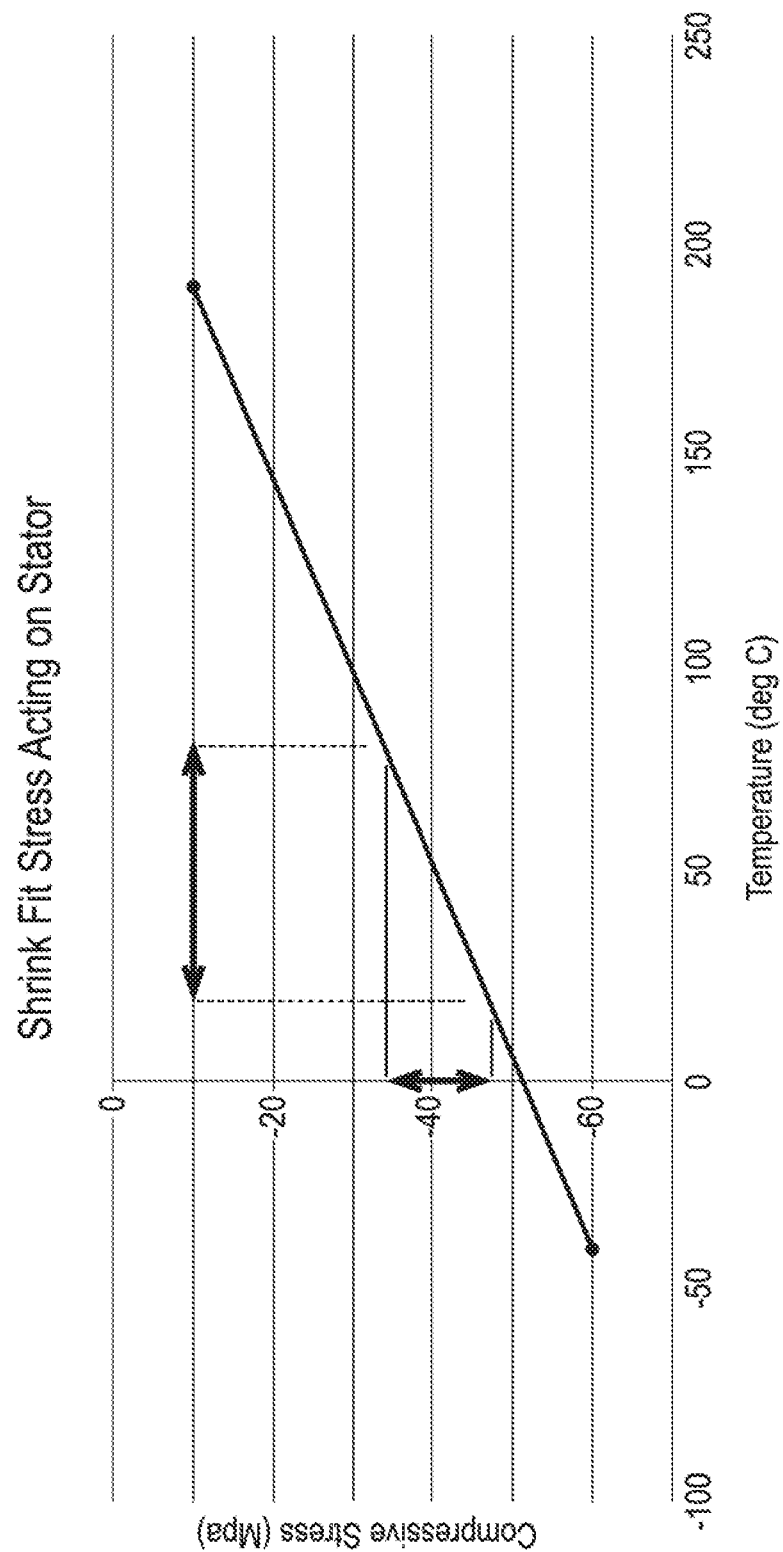
FIG. 4 illustrates an example chart of compressive stress versus temperature.
Figure 5:
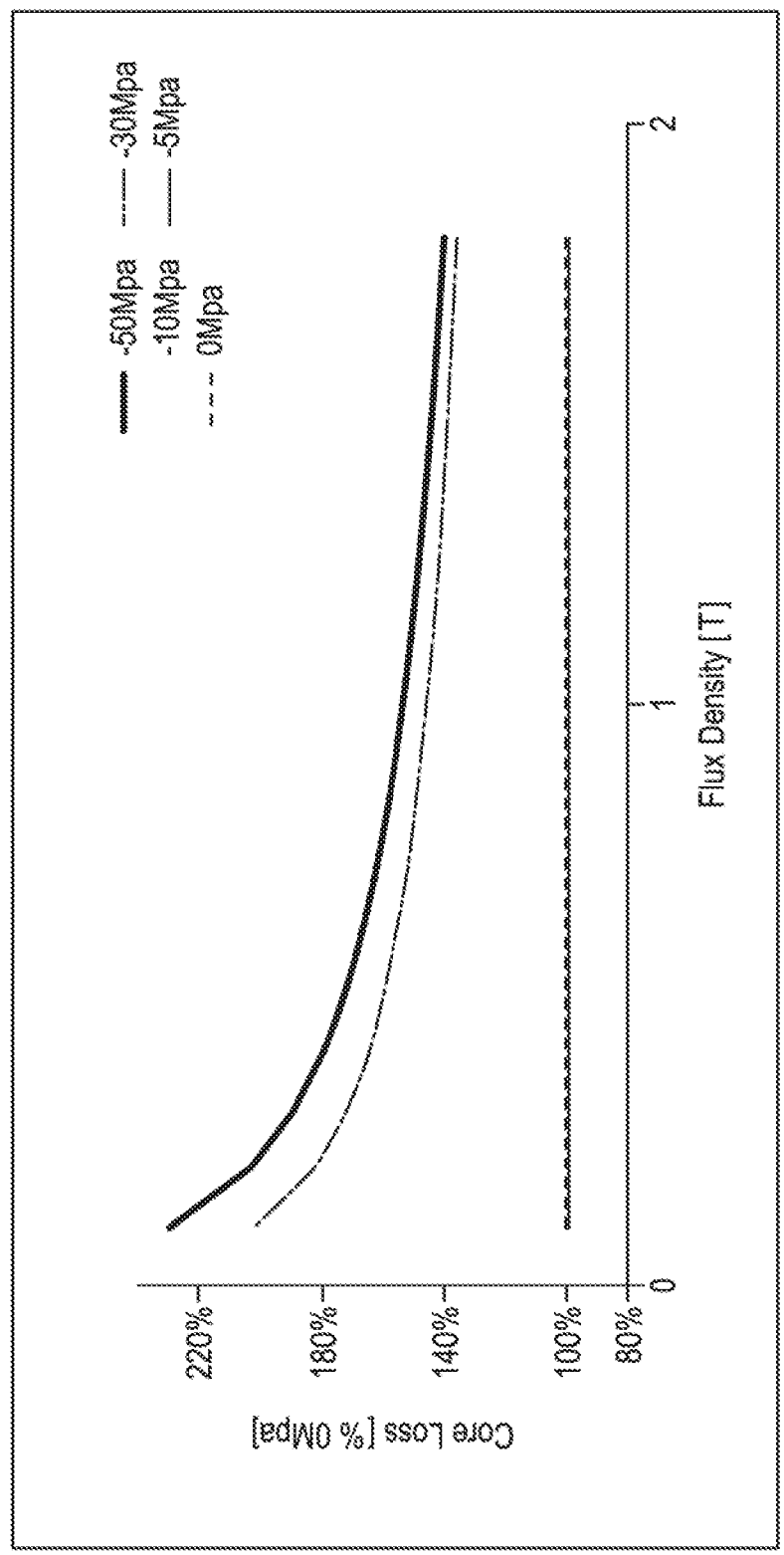
FIG. 5 illustrates an example chart of a loss of compression force as a function of flux.
Figure 6:
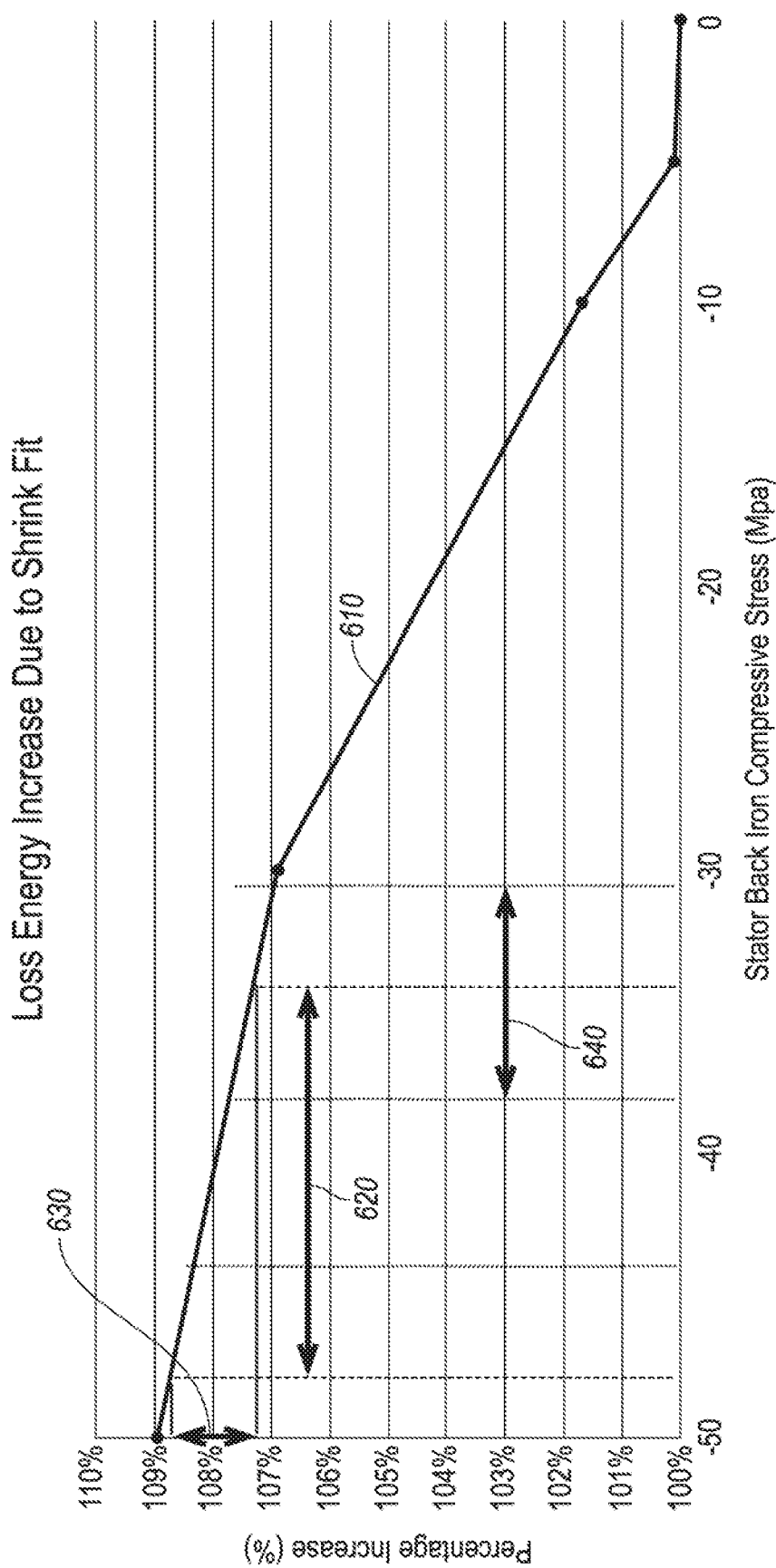
FIG. 6 illustrates loss energy increase as a function of compressive stress.

FIGS. 4-6 illustrate the effect of compressive stress in the stator back iron of a representative stator and the resulting impact on efficiency as generated by computer models. The data were generated for a BEV application having a stator press-fit into the case. As such, the data demonstrate the potential increase in motor efficiency associated with reducing or eliminating the compressive stress associated with securing the stator within the case using one or more embodiments of a stator attachment mechanism according to the present disclosure.

FIG. 4 illustrates an example chart of compressive stress versus temperature. The compressive forces, measured in megapascals (Mpa), may increase as temperature increases. In this chart, the case 110 may have an assumed average temperature range of 20 to 80 degrees Celsius as represented at 410. The compressive stress on the back iron 120 may be predicted to be approximately −48 Mpa to −34 Mpa as indicated at 420. This may be determined based on average minimal principal stresses at various radii of the stator 105 and applying a linear fit as represented by line 430. The data illustrated are based on a nominal press-fit and do not account for min/max tolerances. Because the stator attachment mechanism according to embodiments of the present disclosure provides a clearance fit between the stator and case (other than at the attachment points), temperature changes may have less of an effect on the compressive stress in the back iron 120, and result in less of an impact on the magnetic characteristics and associated motor efficiency.

FIG. 5 illustrates an example chart of core loss as a function of flux at a frequency of 50 Hz for different compressive stresses. FIG. 5 defines a baseline core loss of 100% for a compressive force of 0 Mpa. For higher compressive forces, the relative core loss percentage may decrease as the flux density increases. Furthermore, the higher the compressive force, the more the core loss percentage may be affected. For example, lower compressive forces such as −5 Mpa, and −10 Mpa maintained a baseline core loss even as the flux density increased. However, higher compressive forces such as −30 Mpa and −50 Mpa exhibited a substantial increase in core loss particular at lower flux densities with the core loss decreasing as the flux density increased.

FIG. 6 illustrates an example chart of a drive system loss energy versus compressive stress of the back iron 120 of the stator 105 as a result of the associated core loss illustrated in FIG. 5. In this chart, higher compressive stresses manifest as higher system energy loss. Line 610 represents eDrive system loss as a percentage relative to a baseline of 100%. Range 620 represents eMotor operating temperatures of 20°–80° C. corresponding to stator back iron compressive stress of between −48 Mpa to −34 Mpa as illustrated in FIG. 4. The resulting system loss is between 7%-9% as represented at 630. If press-fit tolerances are considered, plus/minus one standard deviation may correspond to a change of 4 Mpa and result in a change of 0.3% in system loss as represented at 640. As also shown in FIG. 6, at a high stress (e.g., −50 Mpa), the percent increase in loss was approximately 109%. At lower stress (e.g., −5 Mpa), the percent increase in loss was just above the baseline of 100%.

Thus, disclosed herein is an attachment mechanism 140 configured to reduce the compressive stress on the stator 105 and thus increase the efficiency of the motor while maintaining structural stability of the motor case or housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A stator system for an electric vehicle motor, comprising:
   a stator forming a back iron and a plurality of teeth extending inwardly therefrom, the stator including a plurality of attachment points protruding radially outwardly from the back iron; and
   a case configured to house the stator and defining a plurality of case openings, each configured to receive one of the attachment points, wherein each attachment point defines at least one T-slot having a proximal portion and a distal portion, the proximal portion having a larger dimension than the distal portion and configured to receive a nut that cooperates with a bolt extending through the case to connect the case to the stator.

2. The system of claim 1, wherein the bolt and the nut provide a clamping force between each attachment point and the case.

3. The system of claim 2, wherein the stator comprises a plurality of laminations.

4. The system of claim 1, wherein the stator comprises four attachment points.

5. The system of claim 1, wherein the attachment points are equidistantly spaced around the back iron.

6. The system of claim 1, wherein the stator is formed of a plurality of stator laminations.

7. A stator system for an electric vehicle, comprising:
   a stator forming a back iron and a plurality of teeth extending inwardly therefrom,
   at least one attachment point protruding radially outwardly from the back iron and configured to engage with a case;
   the attachment point defining at least one slot configured to receive a nut that cooperates with a bolt to connect the case to the stator, wherein the at least one slot is a T-slot having a proximal portion and a distal portion, the proximal portion having a larger dimension than the distal portion.

8. The system of claim 7, wherein the T-slot is configured to receive the nut within the proximal portion and abut the distal portion, the nut and bolt configured to apply a clamping force to the attachment point and the case to affix the case to the stator.

9. The system of claim 8, wherein the bolt includes a bolt head configured to abut an outer periphery of the case and cause the case to engage with the stator as the bolt is tightened.

10. The system of claim 7, wherein the stator comprises four attachment points.

11. The system of claim 7, wherein the at least one attachment point includes a plurality of attachment points equidistantly spaced around the back iron.

12. A stator attachment mechanism, comprising:
   at least one bolt ear protruding radially outwardly from a back iron of a stator and configured to engage with a case, the bolt ear defining at least one T-slot configured to maintain a nut in a proximal portion of the T-slot, the nut configured to receive a bolt extending through the case and through a distal portion of the T-slot wherein the bolt tightens to the nut to fix the case to the stator.

13. The mechanism of claim 12, wherein the proximal portion has a larger dimension than the distal portion.

14. The mechanism of claim 12, wherein the bolt includes a bolt head configured to abut an outer periphery of the case and cause the case to engage with the stator during the tightening to the nut.

* * * * *